D. A. HELMICH.
CELLULAR WALL FOR SEWAGE DISPOSAL APPARATUS.
APPLICATION FILED FEB. 18, 1910.

1,033,011.

Patented July 16, 1912.

WITNESSES:

INVENTOR
DANIEL A. HELMICH
BY
ATTORNEY

UNITED STATES PATENT OFFICE.

DANIEL A. HELMICH, OF BIRMINGHAM, ALABAMA, ASSIGNOR TO LESTER E. TERRY, OF SOUTHAMPTON, NEW YORK.

CELLULAR WALL FOR SEWAGE-DISPOSAL APPARATUS.

1,033,011.  Specification of Letters Patent.  Patented July 16, 1912.

Application filed February 18, 1910. Serial No. 544,549.

*To all whom it may concern:*

Be it known that I, DANIEL A. HELMICH, a citizen of the United States, residing at Birmingham, in the county of Jefferson and State of Alabama, have invented new and useful Improvements in Cellular Walls for Sewage-Disposal Apparatus, of which the following is a specification.

My invention relates to certain novel improvements in an earth inclosed apparatus for the disposal of sewage.

The particular feature of my invention which forms the subject matter of this application, is the manner of forming the walls of the pit or cavity in which the sewage is received for disposal and distribution into the surrounding earth.

My object is to particularly strengthen the walls of the cavity so as to prevent any tendency to cave in and at the same time to do this without interfering with the ready absorption by the surrounding earth of the liquids of the sewage in the tank. To this end I line the walls of the earth cavity with ordinary hollow tiling, such, for instance, as the hollow tiles used for partitions in buildings, and I arrange these radially so that the sewage will flow freely through them into the surrounding earth. I have found that moss serves as a very effective filling for the hollow tile and may also be used in the bacteria bed in combination with material such as furnace slag, broken brickbats and broken rock.

In my preferred embodiment my invention is illustrated in connection with a septic tank equipment which however forms no part of my present invention.

Figure 1:
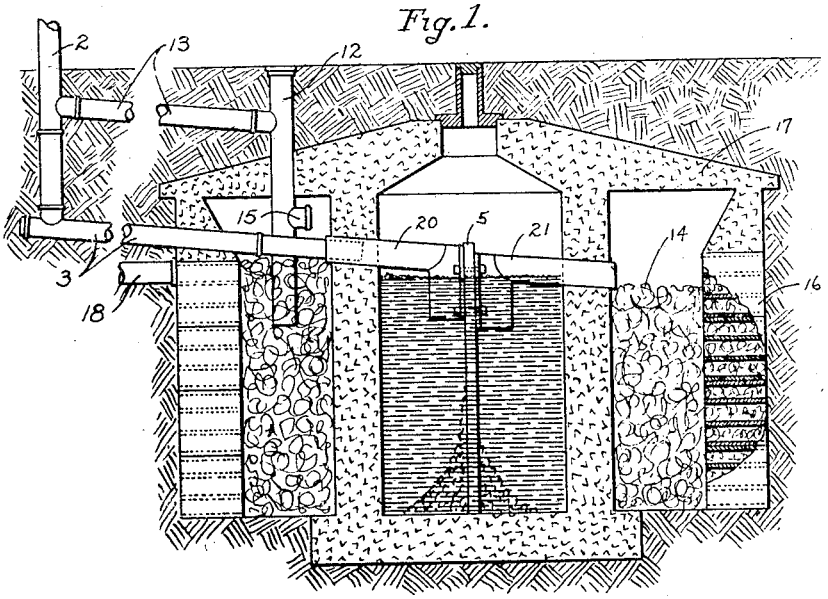
Figure 2:
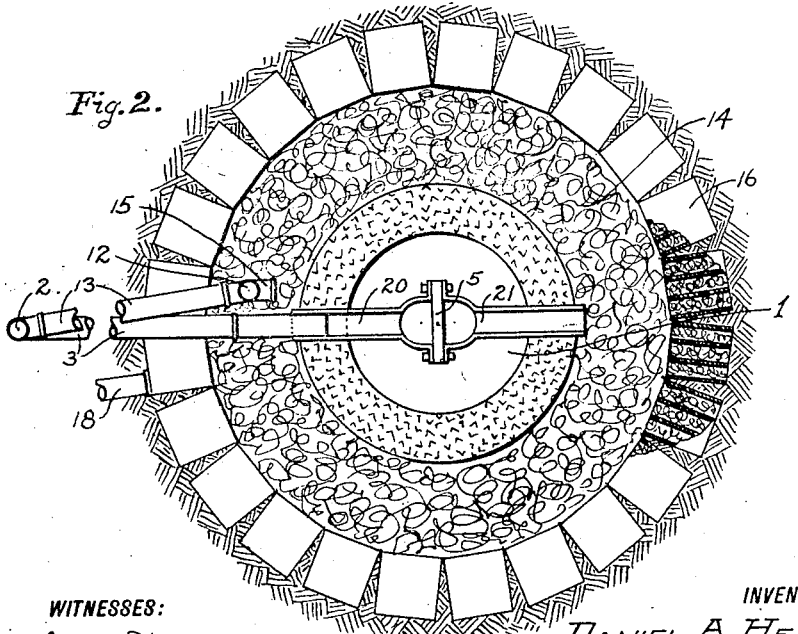

In Figure 1 the pit or cavity for the sewage is shown in vertical cross sectional elevation. Fig. 2 is a plan view of Fig. 1 with the cover removed.

Similar reference numerals refer to similar parts throughout the drawings.

The sewage to be treated is shown discharged into a tank 1 through a stack 2 and pipe 3, which discharges into an inlet duct 20 connected to a dash-board 5. The walls of tank 1 are preferably formed of concrete. The sewage flows out through an outlet duct 21 into the receptacle from which it is desired to distribute it into the surrounding earth. This cavity is preferably filled with loose porous material 14, such as furnace slag, broken rock and brick bats. Moss may be advantageously used by intermingling it with the said slag or brick bats, the whole forming a porous bed through which the sewage filters to the walls of the earth cavity. I provide a concrete top 17 extending over the earth cavity and it may be formed integral with the inner tank 1 when the latter is used.

In order to support the side wall of the earth cavity forming the sewage receptacle to prevent its caving in, I provide a wall built up of hollow tiles 16, preferably the ordinary type of tile used in buildings for forming partitions, and I arrange these tiles with the longitudinal apertures or cells disposed outwardly or radially. I preferably fill these apertures with moss or other porous filling 14 to prevent the earth, when wet, from working in through the tiles into the tank or cavity. These tiles or cellular units not only form a firm support for the outer edge of the cover 17 for the apparatus, but they interfere to no appreciable extent with the outflow of the sewage into the surrounding earth.

No claim is made in this application to any part of the invention disclosed except the integral cellular units which are laid in tiers to form the surrounding walls of the earth inclosed sewage receptacle and are so arranged that their cells will extend from the inner to the outer surface of the cellular wall, said cells being provided, if desired, with a porous filling. All other features relating to the septic treatment of the sewage form the subject matter of my pending application, Serial No. 560,852, filed May 12th, 1910. The earth inclosed sewage receptacle may be of the septic or the ordinary cess pool type.

Having thus described my invention, what I claim as new and desire to secure by Letters Patent, is:—

1. An earth inclosed sewage receptacle having a wall built up of integral cellular units laid upon each other in tiers so that the cells will extend from the inner to the outer surface of said wall.

2. An earth inclosed sewage receptacle having a wall built of integral cellular units laid upon each other in tiers so that the cells will extend from the inner to the outer surface of said wall, and a porous filling inserted in the cells of said units, substantially as described.

3. An earth inclosed sewage receptacle having a wall built of integral cellular units laid upon each other in tiers so that the cells will extend from the inner to the outer surface of said wall, and a fibrous filling inserted in the cells of said units, substantially as described.

4. An earth inclosed sewage receptacle having a wall built of integral cellular units laid upon each other in tiers so that the cells will extend from the inner to the outer surface of said wall, and a filling of moss inserted in the cells of said units, substantially as described.

In testimony whereof I have hereunto set my hand in presence of two subscribing witnesses.

DANIEL A. HELMICH.

Witnesses:
R. D. JOHNSTON, Jr.,
ANNIE L. PEACE.